United States Patent
Traser et al.

(10) Patent No.: US 9,718,992 B2
(45) Date of Patent: Aug. 1, 2017

(54) PROFILED PROTECTIVE TAPE FOR ROTOR BLADES OF WIND TURBINE GENERATORS

(75) Inventors: Steffen Traser, Darmstadt (DE); Bernd Kuehneweg, Duesseldorf (DE); Christian Claus, Düsseldorf (DE); Jan D. Forster, Aachen (DE)

(73) Assignee: 3M INNOVATIVE PROPERTIES COMPANY, Saint Paul, MN (US)

( * ) Notice: Subject to any disclaimer, the term of this patent is extended or adjusted under 35 U.S.C. 154(b) by 528 days.

(21) Appl. No.: 14/235,542

(22) PCT Filed: Jul. 26, 2012

(86) PCT No.: PCT/US2012/048219
§ 371 (c)(1),
(2), (4) Date: Jan. 29, 2014

(87) PCT Pub. No.: WO2013/019524
PCT Pub. Date: Feb. 7, 2013

(65) Prior Publication Data
US 2014/0154089 A1    Jun. 5, 2014

(30) Foreign Application Priority Data
Jul. 29, 2011    (EP) .................................. 11176051

(51) Int. Cl.
*C09J 7/02*    (2006.01)
*C09J 5/08*    (2006.01)
(Continued)

(52) U.S. Cl.
CPC ................. *C09J 7/02* (2013.01); *B32B 37/24* (2013.01); *C09J 5/08* (2013.01); *C09J 7/0217* (2013.01);
(Continued)

(58) Field of Classification Search
CPC ..... C09J 7/02; C09J 5/08; C09J 7/0217; C09J 2201/36; C09J 2201/28; C09J 2475/006;
(Continued)

(56) References Cited

U.S. PATENT DOCUMENTS 3,930,102 A    12/1975    Muller
4,550,052 A    10/1985    Malek
(Continued)

FOREIGN PATENT DOCUMENTS

EP    2551024    1/2013
EP    2551102    1/2013
(Continued)

OTHER PUBLICATIONS

International Search Report for PCT International Application No. PCT/US2012/048219 Mailed on Sep. 6, 2012, 3 pages.

*Primary Examiner* — Ryan J Walters
(74) *Attorney, Agent, or Firm* — 3M Innovative Properties Company; Carlos M. Téllez

(57) ABSTRACT

A multilayer protective tape for rotor blades of wind energy turbines said tape having a protective top layer comprising a polymer film and an adhesive bottom layer, wherein the top layer has a continuous surface (S) that is outwardly curved or outwardly trapezoidal surface such that the tape has a cross-sectional profile having an inner section between two lateral sections and wherein the inner section has a thickness (Ti) made up by the thickness of the top layer and adhesive bottom layer that is greater than the thickness of at least one of the lateral sections (T1,T2) made up by the thickness of the top layer and adhesive bottom layer and wherein the thickness (T1 or T2) of at least one lateral section is at most 600 μm and the thickness of the inner section (Ti) is at least 330 μm. Also provided are processes
(Continued)

for making profiled tapes and methods for applying the tapes to rotor blades and blades containing protective tapes.

15 Claims, 6 Drawing Sheets

(51) Int. Cl.
  *B32B 37/24* (2006.01)
  *F03D 1/06* (2006.01)

(52) U.S. Cl.
  CPC ......... *F03D 1/0675* (2013.01); *C09J 2201/28* (2013.01); *C09J 2201/36* (2013.01); *C09J 2475/006* (2013.01); *Y02E 10/721* (2013.01); *Y10T 156/10* (2015.01); *Y10T 428/24496* (2015.01); *Y10T 428/24521* (2015.01); *Y10T 428/24612* (2015.01)

(58) Field of Classification Search
  CPC .................. B32B 37/24; F03D 1/0675; Y10T 428/24612; Y10T 156/10; Y10T 428/24496; Y10T 428/24521; Y02E 10/721
  See application file for complete search history.

(56) References Cited

U.S. PATENT DOCUMENTS

| 4,599,265 A | 7/1986 | Esmay |
| 4,693,776 A | 9/1987 | Krampe |
| 4,925,671 A | 5/1990 | Abber |
| 5,116,676 A | 5/1992 | Winslow |
| 5,316,846 A | 5/1994 | Pinsky |
| 5,851,664 A | 12/1998 | Bennett |
| 6,045,922 A | 4/2000 | Janseen |
| 6,048,431 A | 4/2000 | Clements |
| 2003/0096109 A1 | 5/2003 | Yanagiuchi |
| 2003/0178124 A1 | 9/2003 | Mikami |
| 2005/0175806 A1* | 8/2005 | Banovetz ............ C09J 7/00 428/40.1 |
| 2013/0243605 A1 | 9/2013 | Watanabe |

FOREIGN PATENT DOCUMENTS

| EP | 2551313 | 1/2013 |
| EP | 2557132 | 2/2013 |
| EP | 2581423 | 4/2013 |
| WO | WO 98-29516 | 7/1998 |
| WO | WO 99-50902 | 10/1999 |
| WO | WO 01-81491 | 11/2001 |
| WO | WO 02-065188 | 8/2002 |
| WO | WO 2011-094385 | 8/2011 |
| WO | WO 2013-019524 | 2/2013 |

* cited by examiner

PROFILED PROTECTIVE TAPE FOR ROTOR BLADES OF WIND TURBINE GENERATORS

CROSS REFERENCE TO RELATED APPLICATIONS

This application is a national stage filing under 35 U.S.C. 371 of International Application No. PCT/US2012/048219, filed Jul. 26, 2012, which claims priority to European Application No. 11176051.8, filed Jul. 29, 2011. The disclosures of both applications are incorporated by reference in their entirety herein.

FIELD

The present disclosure relates to a protective tape for a rotor blade of a wind turbine generator. The tape has a non-uniform thickness profile in a widthwise direction.

BACKGROUND

Rotor blades of wind energy power plants are made of composite materials, typically glass-fiber composites. The materials can be damaged by rain, sand, ice, and hailstones, a process which is commonly referred to as "erosion". Protective tapes can be applied to the rotor blades to protect them from erosion. Typically, the tapes are wrapped around the leading edge of the rotor blade and adhered to the blade by an adhesive. Commercial tapes are usually planar and comprise a polymer film as protective layer and an adhesive layer for attachment to the rotor blade. Typical tapes are up to 400 µm thick of which the adhesive layer typically has a thickness of less than 100 µm to avoid making an impact on the aerodynamic profile of the blade. The tapes may be prepared by extruding the protective resin through a rectangular die of the required dimension to define thickness and width of the tape and coating the adhesive onto the extruded film. The adhesive layer is typically covered on its external surface by a release liner and the tapes are wound up into rolls for storage and handling.

Rotor blade manufacturers apply the protective tapes after removal of the release liner to the rotor blade. After application of the tape the rotor blades are transported to the wind farms where they are installed. The tapes may also be applied to the blades after they had been installed in the wind farm.

Rotor blades for wind turbine generators are becoming increasingly longer and typically may now have a span of greater than 40 m, e.g. 60 m. Furthermore, wind turbine generators are increasingly set up off-shore subjecting the protective tape to greater forces and harsher erosion conditions. This means that protective tapes have to face stronger forces, for example during transportation to the off-shore power plant and/or to harsher erosion conditions.

Therefore, there is a need to provide alternative protective tapes that may appropriately meet the above described challenges.

SUMMARY

In the following there is provided in one aspect a multilayer protective tape (1) for rotor blades of wind energy turbines said tape (1) having a protective top layer (2) comprising a polymer film and an adhesive bottom layer (3), wherein the top layer (2) has a continuous surface (S) that is outwardly curved or outwardly trapezoidal such that the tape (1) has a cross-sectional profile having an inner section between two lateral sections and wherein the inner section has a thickness (Ti) made up by the thickness of the top layer (2) and adhesive bottom layer (3) that is greater than the thickness of at least one of the lateral sections (T1,T2) made up by the thickness of the top layer (2) and adhesive bottom layer (3) and wherein the thickness (T1 or T2) of at least one lateral section is at most 600 µm and the thickness of the inner section (Ti) is at least 330 µm.

In another aspect there is provided a method of protecting a rotor blade of a wind turbine from erosion comprising
providing the protective tape (1) above and adhering it to the rotor blade.

In a further aspect there is provided a method of protecting a rotor blade from erosion comprising (i) providing the protective tape (1) above wherein the adhesive bottom layer (3) has an upper surface facing the top layer (2) and a bottom surface opposite thereto and wherein the bottom surface is patterned to comprise a plurality of grooves or dots;
(ii) applying a liquid adhesive to the rotor blade, to the patterned bottom surface of the tape or both, and
(iii) attaching the tape to the rotor blade.

In yet another aspect there is provided a rotor blade comprising around its leading edge a protective tape (1) wherein the lateral sides of the tape face the trailing edge of the blade.

In yet a further aspect there is provided a process of forming a multilayer protective tape (1) comprising:
(i) providing a substrate (4);
(ii) providing in a coating chamber (6) a coating knife (300) having a profiled recess (301) at its lower end facing the substrate (4) and which forms a gap (401) normal to the surface of the substrate (4);
(iii) moving the substrate (4) relative to the coating knive (300) in a downstream direction;
(iv) providing to the upstream side of the coating knife (300) a curable adhesive thereby coating an adhesive layer (3) onto the substrate (4) through the gap (401);
(v) providing a polymer film (2) to the upstream side of the coating knife (300) and feeding the film (2) simultaneously with the adhesive layer (3) through the recess (301) of the coating knife (300), wherein the film (2) is positioned between the recess (301) and the adhesive layer (3);
(vi) curing the adhesive of the multilayer tape thus obtained, wherein the profiled recess (301) of the coating knife (300) and the size of the gap (400) between the coating knife (300) and the substrate (4) define the cross-sectional profile of the tape (1).

BRIEF DESCRIPTION OF THE DRAWINGS

The disclosure may be more completely understood in consideration of the following detailed description of various embodiments of the disclosure in connection with the accompanying drawings.

DETAILED DESCRIPTION

Figure 1A:
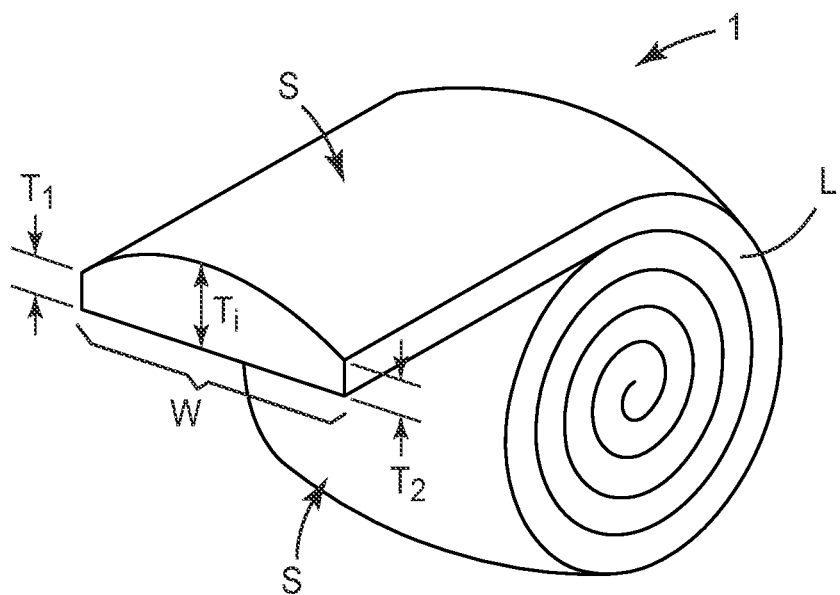
FIG. 1A is a schematic perspective representation of a protective tape according to the present disclosure round up to a roll.

Reference will now be made in detail to embodiments of the disclosure, one or more examples of which are illustrated in the drawings. Features illustrated or described as part of one embodiment can be used with other embodiments to yield still a third embodiment. It is intended that the present disclosure include these and other modifications and variations.

Protective Tape:

A perspective view of an exemplary protective tape having a cross-sectional profile according to the present disclosure is illustrated in FIG. 1A, which shows the tape wound up to a roll. The protective tape (1) has a length (L), a width (W) and a thickness (T). The length of the tape is its longest dimension followed by its width, wherein the length of the tape is always greater than its width. The width of the tape is always greater than its thickness. Typically, the tape has a width of at least 150 mm. Typically, the tape has a length of at least 50 cm.

Figure 1B:
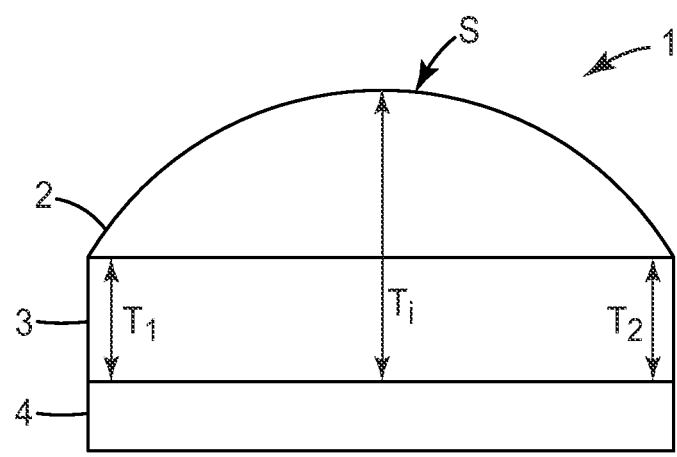
FIG. 1B is an enlarged cross-sectional representation of a section of the protective tape of FIG. 1A.
Figure 2A:
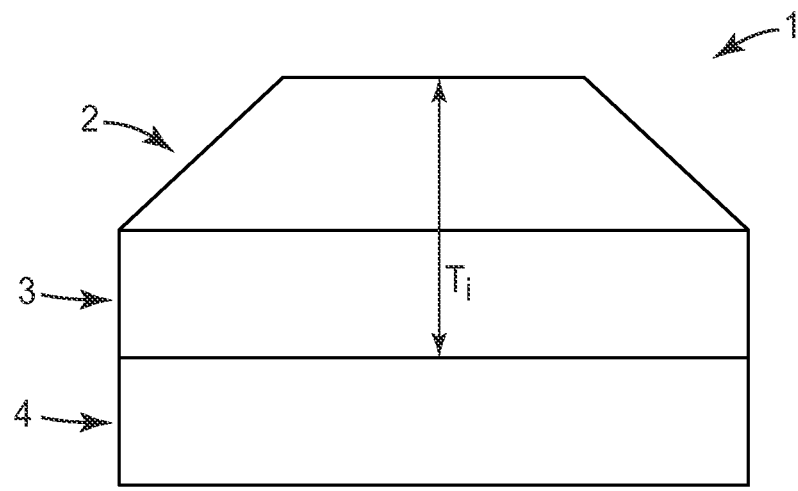
FIG. 2A is a schematic cross-sectional representation of the protective tape according to the present disclosure having a trapezoidal surface.
Figure 2B:
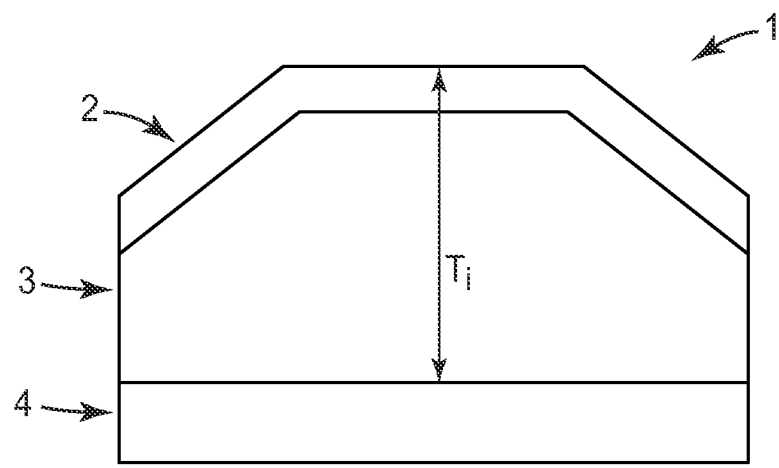
FIG. 2B is a schematic cross-sectional representation of the protective tape according to the present disclosure having a trapezoidal surface.

The tape (1) has a profiled cross-section. The surface (S) of the tape has a cross-sectional profile such that the tape, across its width, has an inner part between two lateral parts wherein the inner part has a thickness (Ti) and the lateral parts have a thickness T1 and T2. The thickness of the inner part (Ti) is greater than the thickness of at least one, preferably both lateral parts (T1, T2) of the tape. The thickness at the inner section of the tape (Ti) may be the maximum thickness of the tape. The surface (S) of the tape is shaped to provide the cross-sectional profile described above. The surface (S) may be outwardly curved, for example to describe a convex shape (as represented in FIGS. 1A and 1B) or it may be angled to describe a trapezoidal shape (as represented in FIGS. 2A and 2B). Therefore, the tape has a thickness at its inner section (across its width or cross-section) that is greater than at its lateral sections or its edges.

FIG. 1B shows the layered-construction of the tape (1). The tape (1) comprises a protective top layer (2) and an adhesive bottom layer (3). The adhesive bottom layer (3) contains the adhesive for attachment to the rotor blade. The top layer (2) and the adhesive bottom layer (3) are arranged parallel to each other. The adhesive layer (3) may contact the top layer (2) directly, in which case top layer (2) and adhesive layer (3) are superimposed or abutting layers or they may be separated from each other by one or more intermediate layers, which are not shown in FIG. 1B. In a preferred embodiment of the present disclosure, the tape does not contain intermediate layers between top layer and adhesive layers, i.e. the top layer abuts the adhesive layer.

The adhesive layer (3) has an internal surface facing the top layer (2) and opposite thereto an external surface. The external surface of the bottom layer faces the rotor blade when applied to the blade. Prior to application to the blade, for example, during manufacturing, storage and transportation of the tape the external surface of the adhesive layer (3) may be covered by a release liner (4).

The surface (S) is typically made up by the top layer (2) of the tape, i.e. the surface of the tape is typically also the surface of the top layer (2). The top layer (2) has an outwardly profiled surface (S) such that the tape has a thickness at its inner part (Ti) that is greater than its thickness at its lateral parts (T1, T2) as shown in FIG. 1B.

The thickness at its inner part (Ti) may be greater than 350 µm or greater than 400 µm and preferably is greater than 500 µm. The tape may have a thickness at its inner part of up to 5,000 µm, or up to 2,000 µm or up to 1,000 µm, or up to 745 µm. The inner thickness Ti and the lateral thicknesses T1, T2 are understood to be the sum of the respective thicknesses of the top layer (2) and the adhesive layer (3) which includes the thickness of any intermediate layer(s) between them but excludes the thickness of any release liner if present. The inner part of the cross-section of the tape may extend to more than 30%, more than 50% or even more than 90% or more than 95% or even more than 99% of the width of the tape but is less than 100% of its width.

The lateral parts of the tape (1) may have a thickness T1, T2 of at most 600 µm, or up to 590 µm, or less than 450 µm, less than 400 µm or less than 300 µm, provided the thickness at the inner part (Ti) is greater than the thickness of at least one, preferably both lateral parts (or edges) of the tape (1).

Typically the tape (1) has a cross-sectional profile such that it has a thickness of at least one at its lateral parts (T1 or T2), preferably at both of its lateral parts (T1 and T2) of up to 600 µm and an increasing thickness towards its inner part from its lateral parts to reach a thickness of greater than 700 µm, greater than 1,000 µm, or 2,000 µm or greater, or up to 5,000 µm. Typically the thickness increases, preferably continuously, from the lateral parts of the tape towards the central part of the tape to reach a maximum thickness of up to about 5,000 µm, up to about 2,125 µm, up to about 1,200 µm or up to about 1,090 µm. Again these thickness ranges are understood to comprise the thickness of top (2) and adhesive layer (3) including the thickness of optional intermediate layers but excluding the thickness of release liners (4) if present.

The thickness profile of the tape (1) increases in thickness from the lateral edges towards the inner part to reach a maximum. Such a profile can be generated by a curved or angular surface (S), which in case of the tape (1) represented in FIG. 1A and FIG. 1B is an outwardly curved surface. "Outwardly" as used herein above and below means a direction across the thickness of the tape starting from the adhesive bottom layer towards the top layer, i.e. in the direction towards the weather exposed part of the tape. Preferably, the increase in thickness is continuous, for example by an outwardly curved shape (as represented in FIG. 1A and FIG. 1B) or a shape having angular sides (as represented in FIG. 2A and FIG. 2B). The maximum thickness may be the apex of a curve or it may be a plateau. The cross-sectional profile may be symmetric. It may also be non symmetric, i.e. the increase in thickness from one lateral part towards the inner part may be greater than the increase of the other side. Alternatively, the thickness at the lateral sides of the tape, i.e. T1 or T2 may not be equal. For example, T1 may be greater than T2. The maximum thickness may be in the middle of the tape (across its width) or offset from it.

The cross-sectional profile of the tape (1) is continuous. This means the profile is not interrupted by a pattern of gaps and grooves. Preferably, the entire surface of the tape (in widthwise and lengthwise direction) is continuous. The external surface of the tape preferably is smooth. However, it is to be understood that some unevenness may be present due to manufacturing constraints, i.e. the surface may have a surface roughness. Generally the surface has a surface roughness (Rz), (DIN EN ISO 4287), of equal or less than 150 µm, preferably, equal or less than 100 µm.

Top Layer:

The top layer (2) contains a polymer film. The polymer typically is a thermoplast or an elastomeric thermoplast. The polymer may be cross-linked or not-cross-linked. The top layer (2) is typically an extruded polymer film but may also be a coated polymer layer. Polymers that can be used to make the top layer (2) or that form the top layer (2) include polyurethanes, polycarbonates, fluoropolymers, epoxy-polymers, silicones, polyester, polyether, and combinations thereof and co-polymers or graft-polymers thereof. Preferably, the top layer (2) contains a polyurethane (PU) polymer which may be a polyurethane homo- or copolymer, more preferably, an extruded polyurethane polymer. The extruded polyurethane may be a thermoplastic elastomeric polyurethane. Thermoplastic elastomeric polyurethanes are known in the art under the abbreviation "TPU". TPU's are formed by the reaction of: diisocyanates with short-chain diols (so-called chain extenders) and diisocyanates with long-chain bifunctional diols (known as polyols). TPU's are commercially available, for example, under the trade designations DESMOPAN, TEXIN, UTECHLLAN from Bayer AG, Germany TPU tapes are also commercially available from 3M Company, St. Paul, USA. The polymer film may contain additives to improve the performance of the polymer composition, for example, but not limited to, anti-oxidation agents, UV-stabilizer, processing additives, fillers and the like.

In one embodiment the top layer (2) has a profiled surface (S) as described above but is itself of uniform thickness. This embodiment is represented in FIG. 2B, showing a trapezoidal top layer (2) over a profiled (trapezoidal) adhesive layer (3) on a release liner (4). Such tape constructions can be obtained by providing an adhesive layer (3) that is already profiled and has a cross-sectional profile as described above and onto which the top layer (2) is adhered. Adhesion between the top layer (2) and the profiled adhesive layer (3) beneath it forces the top layer (2) to take up the profile of the pre-shaped adhesive layer (3). The top layer of this embodiment preferably has a thickness of at least 50 µm and up to 1,500 µm or from at least 100 µm up to about 500 µm.

A profiled adhesive layer (3) may be generated by feeding a curable adhesive precursor through a coating knife having an appropriately shaped recess to create the desired profile and feeding the top layer, preferably provided as a flexible film between the curable adhesive around the profiled recess of the coating knife and curing the adhesive.

Instead of providing the top layer material as a film it is also contemplated by this disclosure to provide the top layer material as a curable polymer composition which can be cured to form a non-adhesive cross-linked polymer and feeding it around the profiled knife and curing the adhesive precursor and simultaneously or subsequently curing the polymer material to form the multi-layer tape (1). Suitable curable polymer compositions include those that are not adhesive after curing and include but are not limited to epoxy compositions, polyurethane compositions or combinations thereof.

In another embodiment the top layer (2) is of non-uniform thickness, i.e. it has a greater thickness at its inner section than at its lateral sections. This embodiment is represented in FIG. 1B for tapes having a convex shape and in FIG. 2A for tapes having a trapezoidal shape. The top layer (2) of such embodiment may have a thickness at its lateral sections of not more than 400 µm, or not more than 300 µm, or not more than 200 µm. The top layer (2) has a thickness at its inner part (across its width) of more than 550 µm, or at least 610 µm or at least 1.520 µm. The maximum thickness of the top layer (2) may be up to 5,000 µm or up to 1,600 µm. In this embodiment the cross-sectional profile of the tape (1) is generated by the shape of the top layer (2). Tapes according to this embodiment may be made, for example, by extruding the material for making up the top layer of the tape through appropriately shaped (profiled) dies and attaching the extruded top layer onto the adhesive layer by coating, laminating or other techniques known in the art, or by the wet-in-wet coating process described herein using appropriately shaped coating knives with appropriate gaps between knife and substrate.

The top layer (2) of the protective tapes (1) may have a flat continuous internal surface (i.e., the surface facing the adhesive layer (3)) but may also have a non flat and/or non continuous surface, for example a patterned internal surface.

Adhesive Layer:

The adhesive layer (3) of the tapes (1) according to the present disclosure may be made of known adhesive materials. Preferably, the adhesive is a pressure sensitive adhesive (PSA). Pressure sensitive adhesives can be applied to a surface using manual force, which is sufficient to bond the adhesive to the surface. PSA's may not require setting (i.e. hardening through solvent evaporation), chemical or thermal treatment for adhering the adhesive to the substrate. Suitable adhesive materials, in particular but not limited to pressure sensitive adhesive materials, include, for example, acrylic based adhesives, vinyl ether based adhesives, natural or synthetic rubber-based adhesives, poly (alpha-olefins) based adhesives and silicone based adhesives and combinations thereof, which are all known in the art. Specific examples are disclosed in U.S. Pat. Nos. 4,925,671, 4,693,776, 3,930,102, 4,599,265, 5,116,676, 6,045,922, and 6,048,431. The adhesives may be obtained by curing from curable adhesive precursors. This means the adhesives obtain their adhesive properties by curing them, for example by a thermal curing reaction, or by irradiation curing, e.g. by actinic irradiation, gamma- or UV-irradiation or e-beam treatment. An example of UV-curable adhesive precursors includes acrylic adhesives precursors. Those precursors are typically liquid materials which harden or solidify or at least increase in viscosity upon cross-linking (curing), which typically involves UV curing.

The adhesive bottom layer (3) of the present disclosure may also contain non-pressure sensitive adhesive materials. Examples of such materials are described in U.S. Pat. No. 5,851,664 and WO 99/50902. In addition, the adhesive layer of the present invention may be a non tacky adhesive as described in U.S. Pat. No. 5,316,846.

Typically, the adhesives of adhesive bottom layer (3) may have a viscosity of at least 2,000, or at least 10,000 or from about 18,000 to about 60,000 mPas or greater that 60,000 mPas at room temperature.

In particular embodiments the adhesives may be used in combination with settable adhesives or curable liquid adhesives as will be described in greater detail below.

Preferably, the adhesive bottom layer (3) comprises at least one acrylic-based adhesive.

The adhesive materials used in the adhesive bottom layer (3) may also include additives. Such additives may include, for example, pigments, dyes, plasticizers, tackifiers, rheology modifiers, fillers, stabilizers, UV radiation absorbers, antioxidants, processing oils, and the like. The amount of additive(s) used can vary from 0.1 to 50 weight percent of the adhesive material, depending on the end use desired. The adhesive layer may also contain particles, in particular hollow particles or agents that expand upon exposure to heat (e.g. blowing agents) to generate a foam adhesive. Also a combination a different adhesives can be used to combine them into a single adhesive mixture. The adhesive bottom layers (3) provided herein may contain a single adhesive layer or two or more than two adhesive layers, preferably superimposed or abutting layers across its thickness. In a preferred embodiment, the tape (1) contains an adhesive layer (3) containing at least two abutting adhesive layers and one of them being a foam adhesive layer. A foam adhesive comprises adhesives containing solid or hollow particles, like but not limited to solid or hollow glass particles or hollow organic polymer particles, gas-filled (other than air) particles or air- or gas-filled cavities. Preferably, the foam adhesive layer is placed underneath the top layer (2), preferably abutting the top layer (2). Foam adhesives may increase the elasticity of the tape which may be beneficial to the impact dampening properties of the tape.

The adhesive bottom layer (3) may typically have a thickness of from about 20 to 120 μm at its lateral sections. In case of a flat, i.e. non-profiled adhesive bottom layer (3) the thickness at its lateral sides is the same as at its inner section. In case of a profiled adhesive bottom layer (3) the bottom layer may have a thickness at its inner part of at 120 μm or at least 400 μm.

Adhesive Layers with Patterned External Surface

Figure 3:
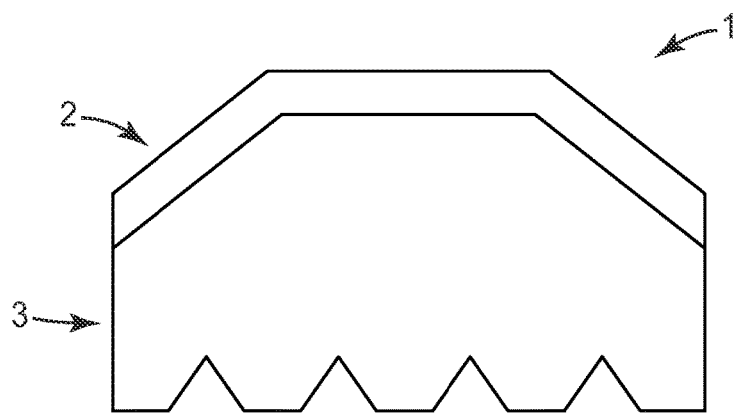
FIG. 3 is a schematic cross-sectional representation of an embodiment of the protective tape according to the present disclosure having a patterned adhesive layer.

In particular embodiments, the adhesive bottom layer (3) may have a patterned external surface. An embodiment of this type is represented in FIG. 3. The external surface of the adhesive bottom layer (3) is the surface that faces the rotor blade (when applied to the blade). For example, the adhesive bottom layer (3) may contain at its external surface a pattern of grooves as shown for the adhesive bottom layer (3) in FIG. 3. In the embodiment represented in FIG. 3 the adhesive bottom layer (3) is also shaped to generate the profiled surface of the top layer (2) of the tape (1) but is to be understood that this embodiment can have any top layer (2) as described herein and a non-profiled adhesive layer. The grooves may extend over the entire width and/or length of the external surface of the adhesive layer (3) or only over parts or separated sections of it. Preferably the pattern is such that the grooves allow an uninterrupted path for a liquid to travel across the width of the tape. The pattern may be symmetric or non-symmetric. The grooves may be parallel to each other or they may be interconnected with each other. The grooves may be linear or non-linear. Instead of grooves also a dotted pattern, preferably a dotted pattern interconnected by grooves may be used. The grooves may have a width of from about 5 μm to 5,000 μm (in case of dots the diameter replaces the width). They may have a depth of from about 5 μm to 500 μm and in fact penetrate the entire thickness of the adhesive layer, exposing the top layer (2) or intermediate layer(s) underneath it—if present. In one embodiment the grooves have a depth that is equal to the thickness of the adhesive bottom layer (3). In another embodiment, the grooves have a depth that is less than the thickness of the adhesive bottom layer (3).

The grooves or dots may cover from 20 to 80% of the surface of the adhesive bottom layer (3).

An advantage of a patterned external surface of the adhesive is that it allows the tape to be easier repositioned and/or to be applied without entrapping air-bubbles. Another advantage is that such a tape may be used in combination with a separate adhesive to provide stronger adhesion to the rotor blade.

In a specific but less preferred embodiment of this disclosure the tape contains a patterned external surface of the adhesive bottom layer (3) as described above but a non-profiled, e.g. a planar top layer wherein the non-profiled top layer is made of the materials as described above. In this less preferred embodiment the tape has no cross-sectional profile. In this particular embodiment the top layer preferably has a thickness of more than 50 μm and less than 5,000 μm. The tape according to this embodiment may also contain an adhesive foam layer as described above. Such embodiments can be prepared by extrusion through ordinarily (non-profiled dies) and coated or laminated onto the adhesive layer. Tapes according to the embodiment may be applied and used as described herein above and below for the profiled tapes.

Protective tapes (1) as provided herein having an adhesive layer (3) with a patterned external surface may be used in connection with one or more liquid adhesives. The liquid adhesive may be curable, which provides a bond by curing it, for example by thermal curing, or irradiation curing as described above. The adhesive may also be a settable adhesive, which provides a bond by setting, for example a hot-melt adhesive or a solvent-based adhesive or a two component (2K) adhesive, which contains two reactive components which cross-link when combined providing an adhesive, moisture curable adhesives which set upon exposure to ambient moisture or a combination of curable and settable adhesives. The liquid adhesives may be painted or sprayed onto the rotor blade. The liquid adhesives may be applied to the rotor blade, to the tape or both prior to attaching the tape to the rotor blade. The liquid adhesive enters the grooves of the tape and is allowed to set or is cured to bond the tape to the rotor blade. The dimension of the grooves and their spatial arrangement with respect to each other can be adapted to the type of liquid adhesive used for achieving maximum adhesion and most convenient application. Typically, the liquid adhesive has a viscosity at the temperature at which it is applied, preferably room temperature (25° C.) of less than 18,000 mPas or less than 10,000 mPas or less than 5,000 mPas, typically from 50 to 16,000 mPas. In this embodiment, where the patterned tape is used with separate liquid adhesives, the adhesive used in the patterned adhesive layer (3) of the tape has a viscosity at room temperature (25° C.) that is equal or greater than the viscosity of the liquid adhesive. Typically, the adhesive of the patterned adhesive layer (3) has a viscosity of at least 2,000, or at least 10,000 or from about 18,000 to about 60,000 mPas or greater that 60,000 mPas at room temperature.

The liquid adhesives may be of the same chemical class (e.g. acrylic based adhesives) as the adhesive of the patterned adhesive layer (3) but may have a different, preferably lower viscosity such that it flows into the grooves of the patterned bottom. Also suitable are liquid adhesives that belong to a different chemical class than the adhesives used in the patterned adhesive layer (3). In one embodiment the adhesive used in the patterned layer comprises an acrylate containing adhesive and the liquid adhesive is selected from acrylate and/or urethane comprising adhesives or from silicone adhesives or from epoxy-based adhesives.

The adhesive bottom layer (3) may also contain a pattern as described above on its internal surface facing the top layer if improvement of the adhesion between top layer (2) or intermediate layers (if present) and the adhesive layer (3) is required.

The pattern on the adhesive bottom layer (3) may be generated by known methods. For example, the grooves in the adhesive layer of the present disclosure may be made as described in WO 98/29516, which is incorporated herein by reference. The topography may be created in the adhesive by any contacting technique, such as casting, coating or compressing. The topography may be made by at least one of: (1) casting the adhesive layer on a tool with an embossed pattern, (2) coating the adhesive layer onto a release liner with an embossed pattern, or (3) passing the adhesive layer through a nip roll to compress the adhesive against a release liner with an embossed pattern. The adhesive may be cross-linked to provide a permanent topography. The topography of the tool used to create the embossed pattern may be made using any known technique, such as, for example, chemical etching, mechanical etching, laser ablation, photolithography, stereolithography, micromachining, knurling, cutting or scoring. The pattern may also be imparted to the adhesive layer by using an appropriately patterned release liner.

The adhesive bottom layer (3) may be a single adhesive layer which may be patterned as described above or non-patterned or it may contain multiple adhesive layers of different adhesives or of adhesives of the same chemical class of adhesives (e.g. acrylic based adhesives, urethane adhesives, silicone adhesives, rubber adhesives and the like) but having different physical properties like, but not limited to adhesive strength, tack, elasticity and/or viscosity.

Tape constructions containing several abutting layers can be prepared by preparing films and laminating them to create a multi-layered tape. In a specific embodiment the tape (1) contains at least two superimposed adhesive layers making up the adhesive bottom layer (3). Such layers may be prepared, for example, by a wet-in-wet coating process. In the wet-in-wet coating process a first layer of a curable adhesive precursor is coated onto a substrate (e.g. a release liner). The coated substrate is then subjected to a second coating step where a second curable adhesive precursor is coated on top. The adhesive precursors are typically liquids and are provided in substantially uncured form. For example, they may have a polymerization degree of less than 50% or less than 25% or even less than 10%. The curable adhesive precursors may have a viscosity which keeps them separated from each other for the time they are in the coating unit prior to subjecting them to curing. The adhesive precursor layers are then cured. It is believed that interfacial diffusion occurs between the adhesive layers leading to a stronger interfacial adhesion upon curing such that the resulting multi-layer product is more resistant to delamination. This wet-in-wet coating process can also be used for making profiled adhesive layers in which case the most downstream coating knife, i.e the coating knife that is arranged at the end of the coating line, has a recess in the shape of the desired profile of the final tape. The coating knives leave a gap between the substrate (and coated substrate respectively) and the lower end of the coating knife through which the adhesive layers and in some embodiments also an extruded protective film will be fed. The size of the gap between the lower ends of the coating knifes and the substrate and the profile of the recess of the most downstream (or last) coating knife determine the thickness and profile of the tape.

Therefore, the disclosure provides a process for making a profiled tape (1) having a profile as described above, the process comprises:

(i) providing a substrate (4);
(ii) providing in a coating chamber (6) a coating knife (300) having a profiled recess (301) at its end facing the substrate (4) and which forms a gap (401) between its profiled lower edge (301) and the substrate (4)
(iii) moving the substrate (4) relative to the coating knife (300) through the coating unit (downstream direction),
(iv) providing to the upstream side of the coating knife (300) a curable adhesive precursor thereby coating an adhesive layer (3) onto the substrate (4);
(v) providing an extruded polymeric film (2) to the upstream side of the coating knife (300) and feeding the film (2) simultaneously with the coated adhesive layer (3) through the profiled recess (301) of the coating knife (300), wherein the film (2) is positioned between the profiled recess (301) of the coating knife (300) and the adhesive layer (3);
(vi) curing the adhesive of the multilayer tape thus obtained,
wherein the profile of the coating knife (300) and the size of the gap (401) between the coating knife (300) and the substrate (4) define the cross-sectional profile of the tape (1).

The process as described above may contain one or more further coating knives arranged in front of the coating knife (300), i.e. in an upstream position with respect to knife (300), through which further adhesive precursors may be fed. The knives are arranged such that they leave a gap between the substrate (4) and their lower edges for the adhesive or a coated layer to pass through. This way, multiple layers of adhesives may be formed. Such a process is referred to as a wet-in-wet process because the curable adhesive precursors are typically liquid compositions. These coating knives may have a profiled recess at their lower edge or may have a flat lower edge. For example a further coating knife (200) may be positioned upstream to the coating knife (300) and leaving a gap between coating knife (200) and substrate (4). On the upstream side of the coating knife (200) a first adhesive precursor is fed around the edge of the coating knife (200) thereby coating a first adhesive layer (7) onto the substrate (4) which is then fed through the coating chamber (6) towards the downstream coating knife (300) described above. The gap of coating knife (300) is chosen such that the second adhesive precursor introduced in chamber (6) and the protective liner (2) can be coated onto the layer already formed on the substrate to form the multilayer tape (1). The coating knife (300) having the profiled recess is the most downstream coating knife, i.e. it is positioned at the end of the coating line before the tape reaches the curing unit.

The curable adhesive precursors used in this process may become adhesive or fully adhesive only upon curing. The adhesives may be fed through the coating knife under ambient pressure or an over-pressure, at room temperature or at increased temperatures, i.e. temperatures above room temperature. Preferably, the adhesive precursors are used in this process, i.e. curable adhesives, more preferably UV-curable adhesives. Preferably, the adhesives have a degree of polymerization of less than 50%, or less than 25% or less than 10%. Instead of one coating chamber, more than one coating chambers, preferably abutting each other, may be used.

The adhesives used to make the tape according to the above described process may be of different chemical classes or of the same chemical class but of different physical properties. For example at least one adhesive, preferably the one adjacent to the top layer (2), may be an adhesive foam material. It may contain solid or hollow particles, it may contain expendable particles, in particular pentane filled expendable microspheres, gaseous cavities, or combinations thereof. The adhesives and/or their precursors of the above described process typically have viscosities that prevent them from quickly mixing which each other. The adhesives and/or their precursors may have identical or different viscosities. Typically, one adhesive and/or its precursor has a viscosity of at least 1,000 mPas at 25° C. and up to 30,000 mPas or up to 10,900 mPas at 25° C. and the other adhesive and/or its precursor, preferably being a foam adhesive, has the same viscosity or a viscosity of from about 2,000 to 12,000 mPas at 25° C., in particular from 2,500 to 9,000 mPas at 25° C.

The substrate used in this process typically is a release liner but may also be an intermediate layer. The release liner may be structured to provide a patterned adhesive bottom layer (3).

Release Liner

The adhesive bottom layer (3) may be covered on its external surface by a release liner (4) for convenient handling and storage. The release liner (4) may be structured on the side facing the adhesive to impart a pattern as described above to the adhesive. The release liner (4) may be any release liner or transfer liner known to those skilled in the art. In case of providing a patterned external surface of the adhesive layer the release liner may be embossed. Typical release liners include polymer coated paper with a silicone release coating, a polyethylene coated polyethylene terepthalate (PET) film with silicone release coatings, or a cast polypropylene film with a silicone release coating.

The release liner (4) typically has a thickness of between 50 and 500 μm.

Application of the Tape

Figure 6:
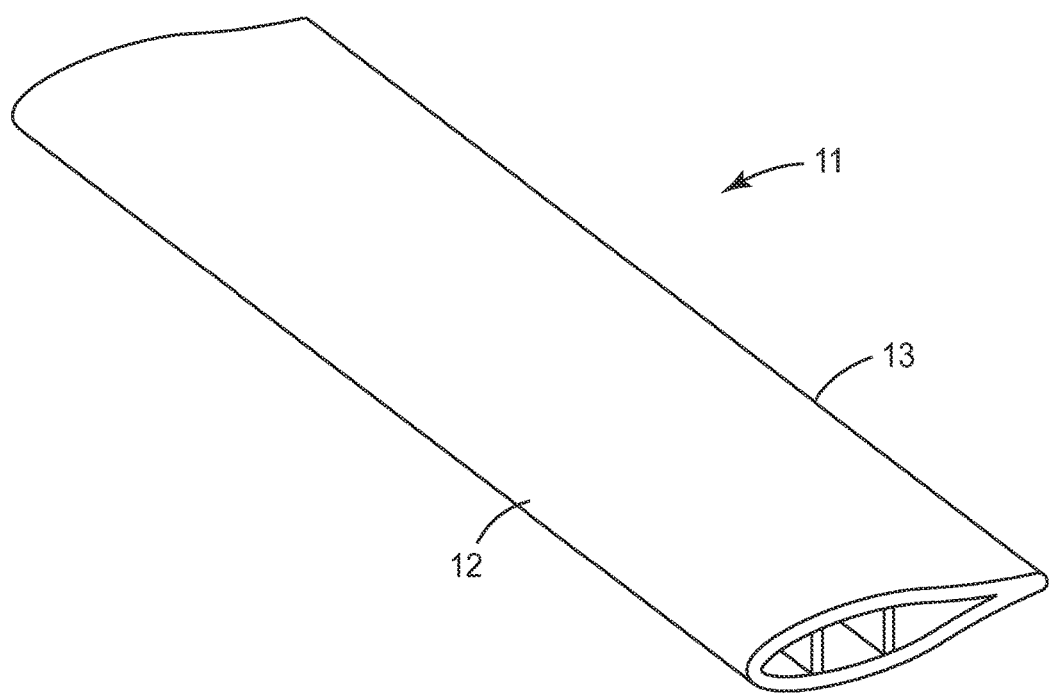
FIG. 6 is a perspective cross-sectional schematic view of a rotor blade for wind turbines.

A typical rotor blade is shown in FIG. 6. As shown in FIG. 6 the blade (11) has a leading edge (12) and a trailing edge (11). The leading edge of the rotor blade is the side that predominantly faces the wind. The tape (1) may be applied to the rotor blade by removing the release liner and wrapping the tape around the rotor blade, typically around the leading edge of the rotor blade and bonding the tape to the blade. The tape (1) is preferably attached to the blade such that it covers the leading edge with its thicker part and the thinner sides of the tape directed towards the trailing edge of the blade.

In a particular embodiment of the present disclosure a tape (1) having a patterned bottom adhesive layer (3) as described above is provided. A liquid adhesive as described above is provided and applied to the blade on the parts to be covered by the tape (1) or on the adhesive side of the tape (1) or both. The tape (1) is then attached to the blade and the liquid adhesive is cured (UV-curing or thermal curing in case the adhesives is UV-curable or thermally curable), or the adhesive is allowed to set in case the liquid adhesive obtains its adhesive strength by setting (e.g. by evaporation of solvent, moisture curing or reaction curing in case of a 2K system). The tape (1) according to this embodiment is attached to the blade by an adhesive bond formed between the liquid adhesive and the patterned adhesive bottom layer (3) of the protective tape (1).

The disclosure will now be described by way of examples and lists of specific embodiments for illustrative purposes only. It is not intended to limit the disclosure to the examples and the specific embodiments.

LIST OF SPECIFIC EMBODIMENTS

1. A multilayer protective tape (1) for rotor blades of wind energy turbines said tape (1) having a protective top layer (2) comprising a polymer film and an adhesive bottom layer (3), wherein the top layer (2) has a continuous surface (S) that is outwardly curved or outwardly trapezoidal such that the tape (1) has a cross-sectional profile having an inner section between two lateral sections and wherein the inner section has a thickness (Ti) made up by the thickness of the top layer (2) and adhesive bottom layer (3) that is greater than the thickness of at least one of the lateral sections (T1,T2) made up by the thickness of the top layer (2) and adhesive bottom layer (3) and wherein the thickness (T1 or T2) of at least one lateral section is at most 600 μm and the thickness of the inner section (Ti) is at least 330 μm.

2. The tape (1) according to embodiment 1 wherein the inner section comprises up to 90%, up to 95% or even up to 99% of the width of the tape.

3. The tape (1) according to any one of the preceding embodiment wherein the cross-sectional profile of the tape is symmetric.

4. The tape (1) according to any one of the preceding embodiments wherein the adhesive bottom layer (3) has an upper surface facing the top layer (2) and a bottom surface opposite thereto and wherein the bottom surface is patterned to comprise a plurality of grooves or dots.

5. The tape (1) according to any one of the preceding embodiments wherein the adhesive bottom layer (3) comprises across its thickness at least two adhesive layers of which one adhesive layer comprises a foam adhesive.

6. The tape (1) according to embodiment 5 wherein the adhesive layer (3) is prepared by a wet-in-wet coating process.

7. The tape (1) according to any one of the preceding embodiments wherein the top layer (2) has a uniform thickness.

8. The tape (1) according to any one of the preceding embodiments wherein the top layer (2) is outwardly curved.

9. The tape (1) according to any one of the preceding embodiments wherein the top layer (2) is outwardly convex.

10. The tape (1) according to any one of embodiments 1 to 9 having a thickness at its inner section (Ti) of from 400 μm up to 5,000 μm and a thickness at the sections (T1, T2) of up to 350 μm.

11. The tape (1) according to any one of the preceding embodiments wherein the adhesive layer (3) comprises an acrylic adhesive.

12. The tape (1) according to any one of the preceding embodiments wherein the top layer (2) comprises a polyurethane.

13. The tape (1) according to embodiment 1 or 2, wherein the cross-sectional profile is not symmetric.

14. The tape (1) according to embodiment 13, wherein the thickness (T1, T2) at the lateral sections of the tape (1) is not equal.

15. The tape (1) according to any one of the preceding embodiments 13 to 14 wherein the adhesive bottom layer (3) has an upper surface facing the top layer (2) and a bottom surface opposite thereto and wherein the bottom surface is patterned to comprise a plurality of grooves or dots.

16. The tape (1) according to any one of the preceding embodiments 13 to 15 wherein the adhesive bottom layer (3) comprises across its thickness at least two adhesive layers of which one adhesive layer comprises a foam adhesive.

17. The tape (1) according to embodiment 16 wherein the adhesive layer (3) is prepared by a wet-in-wet coating process.

18. The tape (1) according to any one of the preceding embodiments 13 to 17 wherein the top layer (2) has a uniform thickness.

19. The tape (1) according to any one of the preceding embodiments 13 to 18 wherein the top layer (2) is outwardly curved.

20. The tape (1) according to any one of the preceding embodiments 13 to 19 wherein the top layer (2) is outwardly convex.

21. The tape (1) according to any one of embodiments 13 to 20 having a thickness at its inner section (Ti) of from 400 µm up to 5,000 µm and a thickness at one of it lateral sections (T1) of up to 350 µm.

22. The tape (1) according to any one of the preceding embodiments 13 to 21 wherein the adhesive layer (3) comprises an acrylic adhesive.

23. The tape (1) according to any one of the preceding embodiments 13 to 22 wherein the top layer (2) comprises a polyurethane.

24. The tape (1) according to any one of the preceding embodiments 1 to 7, and 10 to 12 having an outwardly trapezoidal cross-sectional profile.

25. The tape (1) according to any one of the preceding embodiments 12 to 18 and 21 to 23 having an outwardly trapezoidal cross-sectional profile.

26. A multilayer protective tape (1) for rotor blades of wind energy turbines said tape (1) having a protective top layer (2) comprising a polymer film and an adhesive bottom layer (3), wherein the top layer (2) has a continuous surface, and wherein the adhesive bottom layer (3) has an upper surface facing the top layer (2) and a bottom surface opposite thereto and wherein the bottom surface is patterned to comprise a plurality of grooves or dots, and wherein the tape has a thickness (combined thickness of layers (2) and (3) of more than 250 µm.

27. The tape (1) according to embodiment 26 wherein the adhesive bottom layer (3) comprises across its thickness at least two adhesive layers of which one adhesive layer comprises a foam adhesive.

28. The tape (1) according to embodiments 26 or 27 wherein the adhesive layer (3) is prepared by a wet-in-wet coating process.

29. The tape (1) according to any one of the preceding embodiments 26 to 28 wherein the top layer (2) has a uniform thickness.

30. The tape (1) according to any one of the preceding embodiments 26 to 29 wherein the adhesive layer (3) comprises an acrylic adhesive.

31. The tape (1) according to any one of the preceding embodiments 26 to 30 wherein the top layer (2) comprises a polyurethane.

32. The tape (1) according to any one of embodiments 26 to 31, wherein the tape has cross-sectional profile that is not symmetric or is symmetric.

33. The tape according to any one of embodiments 26 to 32, wherein the tape has a surface (S) that is outwardly curved or outwardly trapezoidal such that the tape (1) has a cross-sectional profile having an inner section between two lateral sections and wherein the inner section has a thickness (Ti) made up by the thickness of the top layer (2) and adhesive bottom layer (3) that is greater than the thickness of at least one of the lateral sections (T1,T2) made up by the thickness of the top layer (2) and adhesive bottom layer (3) and wherein the thickness (T1 or T2) of at least one lateral section is at most 600 µm and the thickness of the inner section (Ti) is at least 330 µm.

34. The tape (1) according to embodiment 33 wherein the inner section comprises up to 90%, up to 95% or even up to 99% of the width of the tape.

35. The tape (1) according to any one of the preceding embodiments 33 and 34 wherein the top layer (2) is outwardly convex.

36. The tape (1) according to any one of embodiments 33 to 35 having a thickness at its inner section (Ti) of from 400 µm up to 5,000 µm and a thickness at the sections (T1, T2) of up to 350 µm.

37. The tape (1) according to any one of embodiment 33 to 36 wherein the thickness (T1, T2) at the lateral sections of the tape (1) is equal or not equal.

38. The tape (1) according to any one of the preceding embodiments 26 to 37 wherein the plurality of grooves or dots has a depth that is equal or less than equal than the thickness of the adhesive bottom layer (3).

39. The tape (1) according to any one of embodiments 33 to 37 having a thickness at its inner section (Ti) of from 400 µm up to 5,000 µm and a thickness at one of it lateral sections (T1) of up to 350 µm.

40. The tape (1) according to any one of the preceding embodiments 33 to 39 having an outwardly trapezoidal cross-sectional profile.

41. Use of a tape according to any one of embodiments 1 to 40 for protecting a rotor blade of a wind turbine from erosion.

42. Method of protecting a rotor blade of a wind turbine from erosion comprising providing a protective tape (1) according to any one of embodiments 1 to 40 and adhering it to the rotor blade.

43. Method of protecting a rotor blade from erosion comprising
 (i) providing a protective tape (1) according to any one of embodiments 26 to 40;
 (ii) applying a liquid adhesive to the rotor blade, to the patterned bottom surface of the tape or both, and
 (iii) attaching the tape to the rotor blade.

44. The method according to embodiment 43 wherein the liquid adhesive has a viscosity of less than 20,000 mPas.

45. The method according to embodiment 43 wherein the liquid adhesive has a viscosity of less than 20,000 mPas and the adhesive of the patterned bottom layer has a viscosity of at least 20,000 mPas.

46. The method according to embodiments 43 to 45 wherein the liquid adhesive is sprayed onto the rotor blade.

47. A rotor blade comprising around its leading edge a protective tape (1) according to any one of embodiments 1 to 40, wherein the lateral sides of the tape face the trailing edge of the blade.

48. Process of forming a multilayer tape (1) according to any one of embodiments 1 to 40 comprising:
 (i) providing a substrate (4);
 (ii) providing in a coating chamber (6) a coating knife (300) having a profiled recess (301) at its lower end facing the substrate (4) and which forms a gap (401) normal to the surface of the substrate (4);
 (iii) moving the substrate (4) relative to the coating knive (300) in a downstream direction;
 (iv) providing to the upstream side of the coating knife (300) a curable adhesive thereby coating an adhesive layer (3) onto the substrate (4) through the gap (401);
 (v) providing a polymer film (2) to the upstream side of the coating knife (300) and feeding the film (2) simultaneously with the adhesive layer (3) through the recess (301) of the coating knife (300), wherein the film (2) is positioned between the recess (301) and the adhesive layer (3);
 (vi) curing the adhesive of the multilayer tape thus obtained, wherein the profiled recess (301) of the coating knife (300) and the size of the gap (400) between the coating knife (300) and the substrate (4) define the cross-sectional profile of the tape (1).

49. The process according to embodiment 48, wherein the substrate (4) is a structured release liner.

Methods

Viscosity:

The viscosity referred to in the general description of this disclosure and the viscosity of the materials used in the example section is Brookfield viscosity, measured at 25° C., unless specified otherwise. Measurements were carried out according to DIN EN ISO 2555:1999 at 25° C. using spindle 3, at 12 rpm in a Brookfield Digital Viscometer DV-II commercially available from Brookfield Engineering Laboratories, Inc.

Surface Roughness (Rz):

The surface roughness (Rz; average maximum height of surface profile) can be determined according to DIN EN ISO 4287 using the method according to DIN EN ISO 4288.

Materials:

AA: Acrylic acid from BASF AG, Germany;

2-EHA: 2-ethylhexylacrylate from BASF AG, Germany;

IOA: Isooctyl acrylate, ester of isooctyl alcohol and acrylic acid, from Sartomer Company, Cray Valley, France;

HDDA: 1,6-Hexanedioldiacrylate (cross-linker) from Sartomer Company, Cray Valley, France;

Aerosil 972: fumed silica, filler, commercially available from Evonik Industries GmbH, Germany;

Glass bubbles K15: low density hollow glass microspheres (density 0.15 g/cm$^3$), foam material, from 3M Company, USA;

Omnirad BDK: 2,2-Dimethoxy-2-phenylacetophenone, UV-initiator, from iGm resins, Waalwijk, Netherlands;

Release liner: HOSTAPHAN 2 SLK, siliconized polyester, 75 μm thickness from Mitsubishi, Wiesbaden, Germany.

EXAMPLES

Preparation of Liquid Adhesive Precursor I:

The liquid adhesive precursor was prepared by combining 90% of ISO with 10% AA and 0.04 pph (parts per hundred based on the sum of IOA and AA) of Omnirad BDK in a glass vessel under stirring for 30 minutes. The mixture was partially polymerized under a mitrogen-rich atmosphere by UV irradiation to a degree of polymerization of approximately 8% giving a Brookfield viscosity of approximately 3,000 mPas at 25° C. Subsequent to the curing 0.12 pph of HDDA and 0.16 pph of Omnirad BDK were added and the resulting mixture was thoroughly stirred for 30 minutes giving a material having a viscosity of 3,500 mPas.

Preparation of Liquid Adhesive Precursor II (Foam Adhesive):

The liquid precursor was prepared by combining 90% of 2-EHA with 10% AA and 0.04 pph (parts per hundred based on the sum of 2-EHA and AA) of Omnirad BDK in a glass vessel under stirring for 30 minutes. The mixture was partially polymerized under a mitrogen-rich atmosphere by UV irradiation to a degree of polymerization of approximately 8% giving a Brookfield viscosity of approximately 2,100 mPas at 25° C. Subsequent to the curing 0.10 pph of HDDA, 0.16 pph of Omnirad BDK, 3 pph of filler and 6 pph of Glasbubbles K15 were added and the resulting mixture was thoroughly stirred for 30 minutes. The resulting precursor had a viscosity of about 10,000 mPas.

Example 1

Preparation of Protective Tape Having a Profiled Surface

Figure 4:
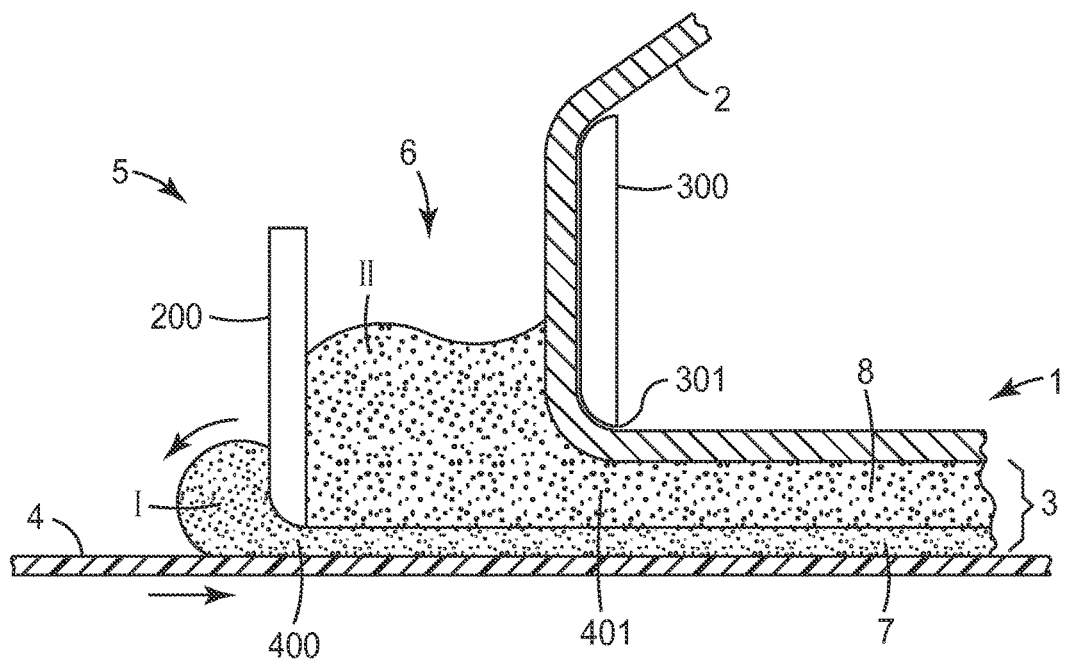
FIG. 4 is a schematic representation of wet-in-wet coating process of example 1.

A profiled adhesive layer was prepared by the wet-in-wet coating process in a coating station represented in FIG. 4 to which will now be referred.

Figure 5A:
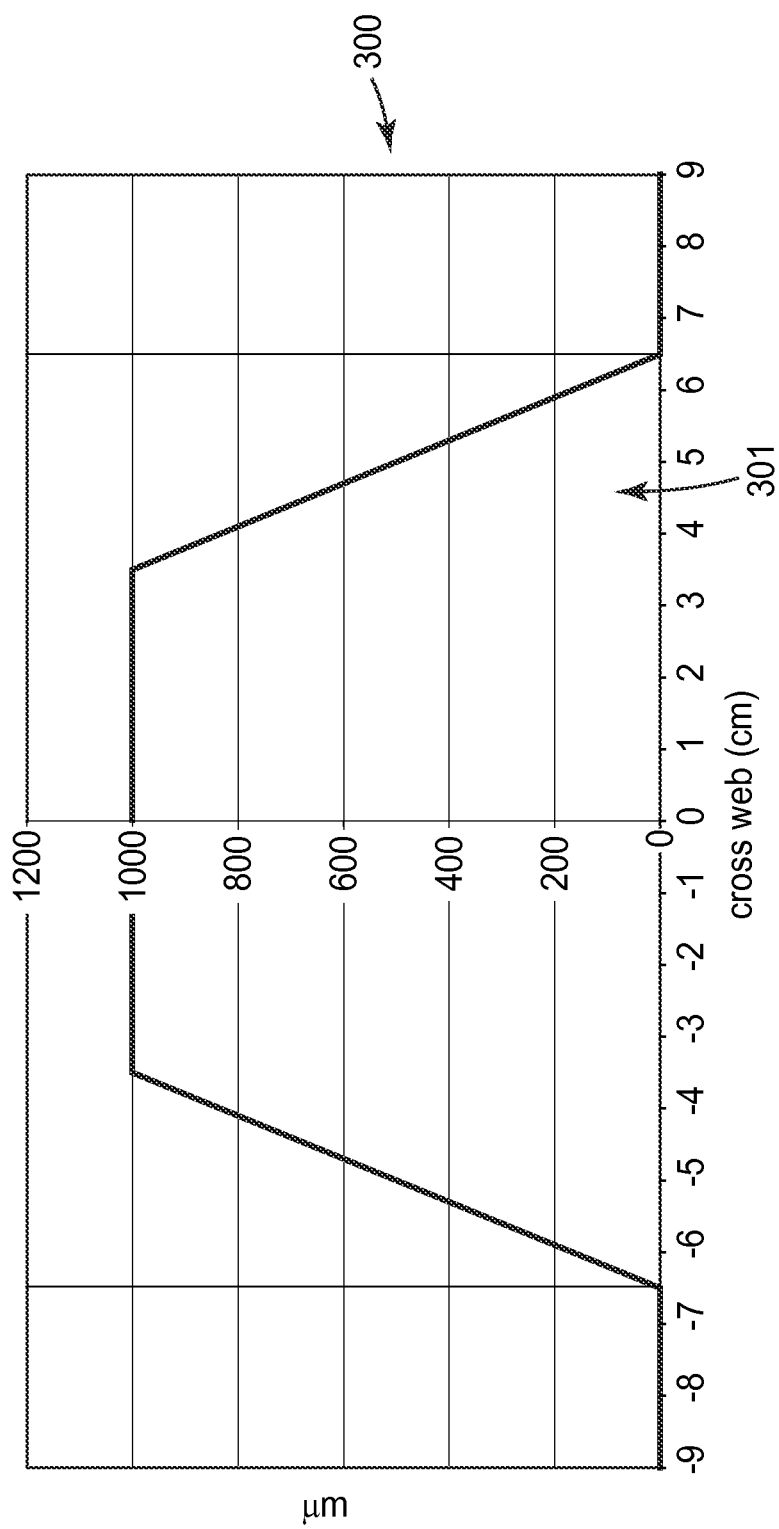
FIG. 5A is a schematic cross-sectional representation of the profiled recess of the downstream coating knife used in example 1.

The coating unit (5) contained a coating chamber (6) made up by the upstream coating knife (200) at its front and the downstream coating knife (300) at its back. The lateral walls of the coating station are not shown. However, it is possible to provide more coating knives if further layers are to be prepared as described above. A substrate (4) was fed through the coating unit (5) in downstream direction as indicated by the straight arrow at a line speed of 6 m/min to reach first the upstream coating knife (200) and then the downstream coating knife (300). A position facing the web direction (downstream direction) is referred to as "upstream position". The position opposite to the "upstream position" is referred to as "downstream position". The substrate used in the example was a release liner (4). Both coating knives were held in a position that left a gap (400), (401) between the lower ends of the coating knives (the ends facing the substrate) and the substrate (4). The upstream coating knife (200) had a flat lower end. The downstream coating knife (300) was provided at its lower end with a profiled recess (301) having a trapezoidal shape as is shown in FIG. 5 A (viewed from the webdirection/downstream direction). The coating knives (200), (300) were arranged vertically spaced apart and held independently from each other. The liquid adhesive precursor (I) was fed on a rolling bead in front of coating knife (200) (upstream side of the coating knife (200), onto the substrate and passed through the gap (400) between the lower end of the coating knife (200) and the substrate (4) thus coating the substrate to form a layer (7). The coated substrate was fed into the coating chamber (6) where the second liquid adhesive precursor (II) was introduced onto to coated substrate (4) under ambient pressure forming a layer (8) superimposed on layer (7).

Figure 5B:
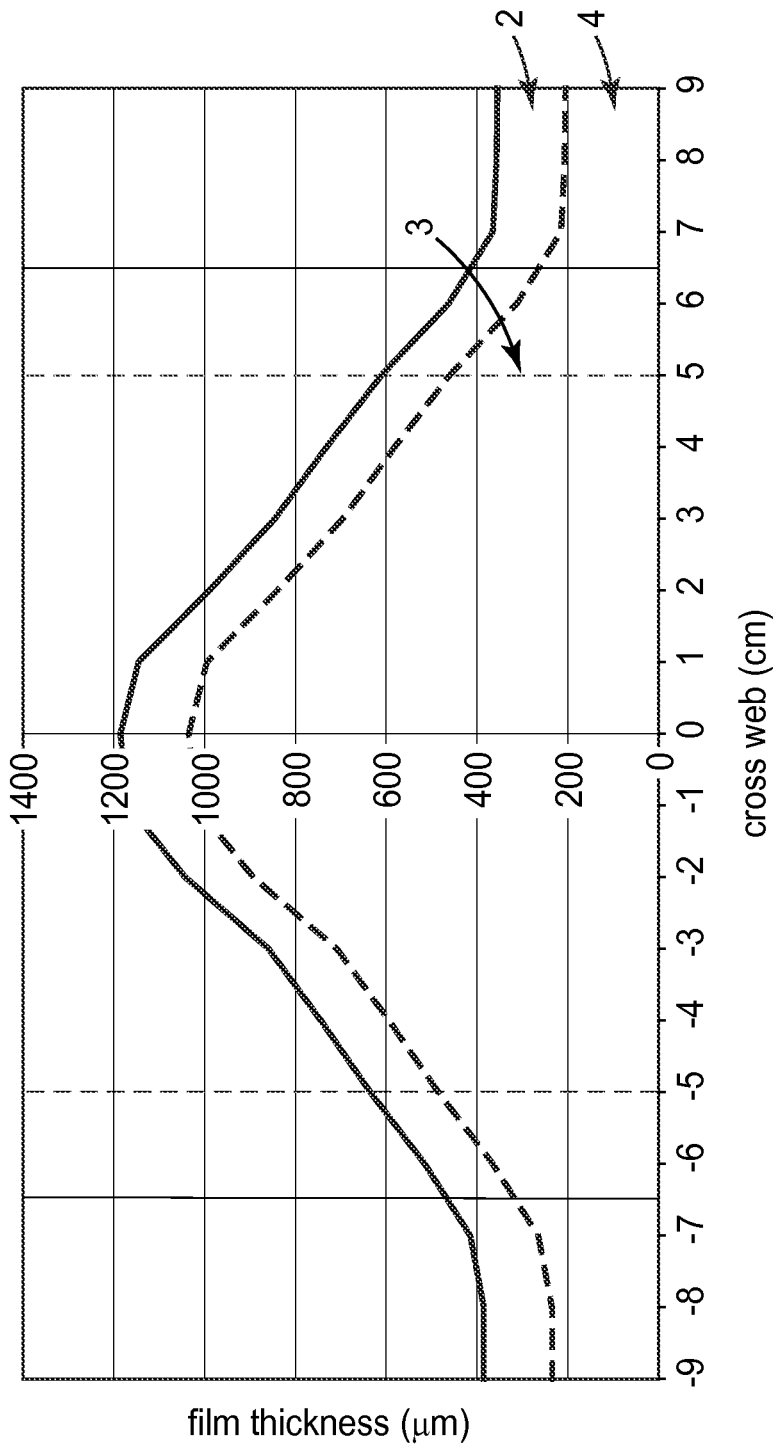
FIG. 5B is the cross-sectional profile of the tape produced in example 1.

In the coating chamber (6), a solid film (2) in the form of a TPU liner of 150 μm thickness was conveyed on the upstream side of the coating knife (300) and fed around the profiled recess (301) of the coating knife (300) simultaneously with the liquid precursor II thus forming a multi-layer tape (1) containing an adhesive layer (3) having separate adhesive layers (7) and (8). The gap (400) between the first (upstream) coating knife (200) and the substrate (4) was such that the adhesive layer (7) had a thickness of about 75 μm. The gap (401) between the flat parts of the profiled recess of the lower edge of the coating knife (300) and the coated substrate (4) was about 400 μm and the gap between the middle of the profiled recess and the substrate was about 1,200 μm. The resulting multilayer tape was then continuously cured in a 3 meter UV-curing station (2.07 mW/cm$^2$ during the first 2 m and 4.27 mW/cm$^2$ at the last meter) to yield an erosion protection tape (1) having a profiled thickness. The cross-sectional profile of the resulting tape is shown in FIG. 5B. The solid line indicates the thickness profile of the tape (including the top layer (2), adhesive layer (3) made up of layers (7) and (8) and the release liner (4). The dotted line indicates the profile of the profiled adhesive bottom layer (3)—without the top layer (2).

Example 1 is provided to demonstrate the construction of a complex tape having an outwardly curved profile with a uniform polyurethane film as top layer and an adhesive bottom layer containing several distinct adhesive layers. It is understood that also much simpler tape constructions are encompassed by the present disclosure. For, example, it may be sufficient to provide an adhesive bottom layer (3) containing just one adhesive layer. Such less complex tapes can also be prepared in the coating system as described above but then only the profiled coating knife may be needed. The adhesive should be chosen such that its viscosity and adhesive strength allows the tape to maintain its shape. Instead of using a foam adhesive also plain adhesives with no foam-type properties may be used. More complex tape constructions could also be provided. In this case further coating knives may be added for generating additional layers.

The complex tape construction provided in example 1 allows for tapes being prepared having adhesive components fine-tuned to the desired needs for a protective wind tape. In particular it is believed that one or more adhesive foam layers may add further protection to damage through sand or hailstones by providing elasticity to the tape.

Example 2

(Hypothetical): Protective Profiled Tape with Patterned Adhesive Layer

The tape prepared in example 1 can be adhered to a tape containing a structured adhesive layer. Such tapes are commercially available, for example under the trade designation CONTROLAC 180 from 3M Company, St. Paul, USA. Such tapes contain a PVC top layer and a bottom layer containing a structured adhesive. The profiled tape can be adhered with its adhesive bottom layer to the PVC side of the CONTROL-TAC tape giving a protective tape having a structured adhesive layer at its bottom and an intermediate non adhesive layer (the PVC layer).

For making tapes without the intermediate layers that would result from the hypothetical example above, the adhesive layer of the multi-layer tape prepared in example 1 can be provided with a pattern by the methods described in the description, for example, but not limited to, embossing using a patterned release liner.

Example 3

Adhesion of a Tape with a Patterned Adhesive Bottom Layer to Liquid Adhesives

A protective tape having a patterned adhesive layer was prepared as follows:

A PVC film having a patterned adhesive layer (CONTROLTAC 180 from 3M Company, St. Paul, USA) was adhered to the adhesive side of a protective film comprising a polyurethane resin as protective layer and an adhesive bottom layer (WINDTAPE 8607 from 3M Company). The protective tape had a uniform profile but the experiment is provided to demonstrate the interaction of the patterned adhesive layer with a liquid adhesive on bonding to rotor blades.

Three different adhesives of different viscosities where applied to the patterned part of the protective tape, which was then wrapped around the leading edge of a glass fiber composite rotor blade and attached by hand wiping from the middle to the sides to remove air and excess liquid adhesive. The liquid adhesive was allowed to cure according to the supplier's instructions.

The following liquid adhesives were used:

Resin I: SCOTCH-WELD UV 11 from 3M Company, St. Paul, USA (urethane-acrylate-based adhesive), viscosity 90 m Pas, UV curable adhesive.

Resin II: SCOTCH-WELD DP 600 SL polyurethane-based adhesive, viscosity 2500-4050 mPas. 2K (2 component) adhesive which cures upon combination of the two reactive components after 24 hours.

Resin III: SCOTCH-WELD DP 810, acrylate-based adhesive, viscosity 20,000-40,000 mPas, UV curable adhesive.

The tapes using liquid adhesives I and II could be easily applied, repositioned and strongly bonded to the blade. Tapes with resin III could not be easily attached to the blade.

To test the strength of the bond, the tapes were removed by hand from the glass-fiber composite. The test was compared by using a TPU—tape having a PSA layer at its bottom that was flat, i.e. not patterned. The tape was attached to the same glass composite material. The tape was removed from the blade by hand which could be carried out more easily than the tests done with adhesives I and II using the patterned material as described above.

What is claimed is:

1. A multilayer protective tape, said tape having:
  a) a protective top layer comprising a polymer film and
  b) an adhesive bottom layer,
    wherein the top layer has a continuous surface (S) that is outwardly curved or outwardly trapezoidal such that the tape has a cross-sectional profile having an inner section between a first edge lateral section and a second edge lateral section,
    wherein the thickness of the inner section is Ti, the thickness of the first edge lateral section is T1, and the thickness of the second edge lateral section is T2,
    wherein Ti is greater than each of T1 or T2,
    wherein the thickness (T1 or T2) of at least one edge lateral section is at most 600 µm and the thickness of the inner section (Ti) is at least 330 µm.

2. The tape according to claim 1 wherein the inner section comprises up to 95% of the width of the tape.

3. The tape according to claim 1 wherein the cross-sectional profile of the tape is symmetric or non symmetric.

4. The tape according to any one of the preceding claims wherein the adhesive bottom layer has an upper surface facing the top layer and a bottom surface opposite thereto and wherein the bottom surface is patterned to comprise a plurality of grooves or dots.

5. The tape according to claim 1 wherein the adhesive bottom layer comprises across its thickness at least two adhesive layers of which one adhesive layer comprises a foam adhesive.

6. The tape according to claim 1 wherein the adhesive layer is prepared by a wet-in-wet coating process.

7. The tape according to claim 1 wherein the top layer is of uniform thickness.

8. The tape according to claim 1 wherein the top layer is outwardly curved.

9. The tape according to claim 1, wherein the thickness Ti of from 400 µm up to 5,000 µm and at least one of T1 or T2 has a thickness of up to 350 µm.

10. The tape according to claim 1 wherein the adhesive layer comprises an acrylic adhesive.

11. The tape according to claim 1 wherein the top layer comprises a polyurethane.

12. Method of protecting a rotor blade of a wind turbine from erosion comprising providing a protective tape according to claim 1 and adhering the tape to the rotor blade.

13. Method of protecting a rotor blade from erosion comprising (i) providing a protective tape according to claim 1, wherein the adhesive bottom layer has an upper surface facing the top layer and a bottom surface opposite thereto and wherein the bottom surface is patterned to comprise a plurality of grooves or dots; (ii) applying a liquid adhesive to the rotor blade, to the patterned bottom surface of the tape or to both the rotor blade and the patterned bottom surface of the tape, and (iii) attaching the tape to the rotor blade.

14. A rotor blade having a leading edge and a trailing edge, wherein the rotor blade comprises around the leading edge a protective tape according to claim 1, and wherein the lateral sides of the tape face the trailing edge of the blade.

15. Process of forming a multilayer tape according to claim 1 comprising:
 (i) providing a substrate, having a surface;
 (ii) providing in a coating chamber a coating knife having a profiled recess at its lower end facing the substrate and which forms a gap normal to the surface of the substrate;
 (iii) moving the substrate relative to the coating knife in a downstream direction;
 (iv) providing to the upstream side of the coating knife a curable adhesive thereby coating an adhesive layer onto the substrate through the gap;
 (v) providing a polymer film to the upstream side of the coating knife and feeding the film simultaneously with the adhesive layer through the recess of the coating knife, wherein the film is positioned between the recess and the adhesive layer;
 (vi) curing the adhesive of the multilayer tape thus obtained, wherein the profiled recess of the coating knife and the size of the gap between the coating knife and the substrate define the cross-sectional profile of the tape.

* * * * *